(12) United States Patent
Togashi et al.

(10) Patent No.: US 9,408,093 B2
(45) Date of Patent: Aug. 2, 2016

(54) MOBILE TERMINAL TEST DEVICE AND MOBILE TERMINAL TEST METHOD

(71) Applicant: ANRITSU CORPORATION, Atsugi-shi, Kanagawa (JP)

(72) Inventors: Haruyuki Togashi, Kanagawa (JP); Dai Arae, Kanagawa (JP); Nobutoshi Otonari, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 14/519,871

(22) Filed: Oct. 21, 2014

(65) Prior Publication Data
US 2015/0148051 A1 May 28, 2015

(30) Foreign Application Priority Data

Nov. 28, 2013 (JP) ................................. 2013-245990

(51) Int. Cl.
| | |
|---|---|
| H04W 24/06 | (2009.01) |
| H04W 52/38 | (2009.01) |
| H04W 52/22 | (2009.01) |
| H04W 52/36 | (2009.01) |
| H04B 17/391 | (2015.01) |
| H04W 52/24 | (2009.01) |
| H04W 74/08 | (2009.01) |
| H04W 88/08 | (2009.01) |

(52) U.S. Cl.
CPC ........... *H04W 24/06* (2013.01); *H04B 17/3912* (2015.01); *H04W 52/22* (2013.01); *H04W 52/367* (2013.01); *H04W 52/38* (2013.01); *H04W 52/223* (2013.01); *H04W 52/228* (2013.01); *H04W 52/245* (2013.01); *H04W 74/0833* (2013.01); *H04W 88/08* (2013.01); *Y02B 60/50* (2013.01)

(58) Field of Classification Search
CPC .... H04W 24/06; H04W 52/22; H04W 52/367
USPC ........................................ 455/452.1
See application file for complete search history.

(56) References Cited

U.S. PATENT DOCUMENTS

| | | | | |
|---|---|---|---|---|
| 2004/0196278 | A1* | 10/2004 | Kida et al. ..................... | 345/211 |
| 2007/0229180 | A1* | 10/2007 | Shimizu et al. ................ | 332/103 |
| 2010/0246857 | A1* | 9/2010 | Kajita ............................ | 381/120 |
| 2013/0203434 | A1* | 8/2013 | Blume et al. ................ | 455/452.1 |

FOREIGN PATENT DOCUMENTS

JP      2003-046431 A     2/2003

* cited by examiner

*Primary Examiner* — Michael Neff
(74) *Attorney, Agent, or Firm* — Pearne & Gordon LLP

(57) ABSTRACT

Setting means does not respond to a transmission signal from a mobile terminal for a predetermined period of time and sets the mobile terminal to a designation value saturation level excess state during a random access process. Data transmission instruction means allocate M resource blocks and N resource blocks (where N is less than M) to the mobile terminal in the designation value saturation level excess state, respectively, and instruct the mobile terminal to transmit signals in which data are inserted into the allocated resource blocks. Power measurement means measures the power of the signals. Determination means determines whether a difference between the measured values when the numbers of resource blocks are M and N is within an allowable range and determines whether the mobile terminal quickly responds to an output power reduction instruction on the basis of the determination results.

3 Claims, 4 Drawing Sheets

MOBILE TERMINAL TEST DEVICE AND MOBILE TERMINAL TEST METHOD

TECHNICAL FIELD

The present invention relates to a technique that tests output power of a mobile terminal (hereinafter, simply referred to as a terminal in some cases), such as a mobile phone or a smart phone, and more particularly, to a technique that can easily determine whether a mobile terminal has a function of rapidly reducing output power to a saturation level or less in response to an output power reduction instruction from, for example, a base station when a test device (pseudo base station) does not deliberately transmit a response for a predetermined period of time such that the output power of the mobile terminal reaches the saturation level and the mobile terminal is in a designation value saturation level excess state in which an output power designation value for designating the output power is within a predetermined range that is greater than the saturation level, during a random access process to the test device.

BACKGROUND ART

There are various test items in a test for the mobile terminal. Among them, an output power control function is an important test item.

In a system in which one base station communicates with a plurality of mobile terminals at the same time, it is necessary to appropriately set the output power of the mobile terminals. Therefore, when the mobile terminal is connected to the base station, the mobile terminal transmits the type of random access preamble instructed by the base station with a relatively low output power through a specific channel, specifies, for example, uplink (UL) or downlink (DL) timing on the basis of response information to the type of random access preamble, which is transmitted from the base station, and changes to a communication state.

In the random access process, when there is no response from the base station, the mobile terminal repeatedly performs a process of increasing the output power by a predetermined value and transmitting the random access preamble again.

When testing the output power increase function, the test device does not deliberately respond to a signal transmitted from the mobile terminal and monitors the level of the received signal to grasp how the output power of the mobile terminal increases sequentially.

During the test, the mobile terminal sequentially increases an output power designation value for designating the output power therein by a predetermined value. However, there are two types of mobile terminals, one of which continuously increases the output power designation value in the mobile terminal even after the output power of the mobile terminal is saturated and updates the output power designation value and the other of which does not perform the increase and update process, when a state in which a response is not transmitted from the base station is maintained. One of the important tests is to specify the type of mobile terminal to be tested.

As a method for confirming this, a method is considered which transmits, to a mobile terminal, an output power reduction instruction to reduce the output power of the mobile terminal by a predetermined value $\Delta Q$ (for example, 1 dB) and to transmit data, using a closed loop power control, in a designation value saturation level excess state in which the output power of the mobile terminal reaches a saturation level and an output power designation value for designating the output power is predicted to be within a predetermined range that is greater than the saturation level.

When receiving the output power reduction instruction, the mobile terminal reduces the output power designation value therein by the predetermined value $\Delta Q$ and transmits, for example, data through a predetermined channel. The test device receives the data and measures the level of the data.

In the case of the mobile terminal in which the output power designation value is not increased and not updated after the output power is saturated, after the output power reduction instruction is received, the output power is reduced from the saturation level by the predetermined value $\Delta Q$. In contrast, in the case of the mobile terminal in which the output power designation value is increased and updated after the output power is saturated, even when the output power designation value is reduced by the predetermined value $\Delta Q$ after the output power reduction instruction is received, the output power is not changed from the saturation level or it is not reduced by the predetermined value $\Delta Q$.

Therefore, if the reception level of the signal from the mobile terminal after the output power reduction instruction is given is less than the reception level when the output power is saturated by the predetermined value $\Delta Q$, the test device can specify the mobile terminal as a type which quickly responds to the output power reduction instruction. If the reception level is hardly changed from the reception level when the output power is saturated or is not reduced by the predetermined value $\Delta Q$, the test device can specify the mobile terminal as a type which does not quickly respond to the output power reduction instruction.

The following Patent Document 1 discloses an example of the structure of a device which performs an output power control test for a mobile terminal.

RELATED ART DOCUMENT

Patent Document

[Patent Document 1] Japanese Unexamined Patent Application Publication No. 2003-46431

DISCLOSURE OF THE INVENTION

Problem that the Invention is to Solve

However, since a small value of a few decibels or less can be reduced as a standard value by one output power reduction instruction in a closed loop power control, it is difficult to determine whether the output power of the mobile terminal is reduced due to, for example, the output power reduction instruction or a change in the test environment.

Therefore, a method is also considered which continuously issues the output power reduction instruction a plurality of times in the closed loop power control to sequentially reduce the output power designation value in the mobile terminal and calculates the tendency of change of the reception level. However, it takes a lot of time to obtain the test result and a complicated process, such as a process of investigating the tendency of change of the reception level, is required.

The invention has been made in order to solve the above-mentioned problems and an object of the invention is to provide a mobile terminal test device and a mobile terminal test method which can reliably and rapidly determine whether a mobile terminal in a designation value saturation level excess state quickly responds to an output power reduction instruction from, for example, a base station.

Means for Solving the Problem

In order to achieve the object, according to a first aspect of the invention, there is provided a mobile terminal test device that simulates a base station, communicates with a mobile terminal to be tested, and tests the mobile terminal. The mobile terminal test device includes setting means (23) for not responding to a transmission signal from the mobile terminal until a predetermined period of time elapses after output power of the mobile terminal reaches a saturation level and for setting the mobile terminal to a designation value saturation level excess state in which an output power designation value for designating the output power in the mobile terminal is predicted to be within a range that is greater than the saturation level, during a random access process to the mobile terminal, first data transmission instruction means (24) for allocating M (where M is an integer equal to or greater than 2) resource blocks to an uplink physical channel and instructing the mobile terminal, which is set to the designation value saturation level excess state, to transmit a signal in which data is inserted into the allocated M resource blocks, second data transmission instruction means (25) for allocating N (where N is an integer less than M) resource blocks to the uplink physical channel and instructing the mobile terminal, which is set to the designation value saturation level excess state, to transmit a signal in which data is inserted into the allocated N resource blocks, power measurement means (26) for measuring power of a physical channel of the signal which is transmitted by the mobile terminal in response to instructions from the first data transmission instruction means and the second data transmission instruction means, and determination means (27) for determining whether a difference between a first measured value which is measured by the power measurement means when the mobile terminal transmits the signal in response to the instruction from the first data transmission instruction means and a second measured value which is measured by the power measurement means when the mobile terminal transmits the signal in response to the instruction from the second data transmission instruction means is within a predetermined allowable range that is determined on the basis of a ratio of M to N. When the difference between the first measured value and the second measured value is within the allowable range, the mobile terminal to be tested is determined to be a quick response type which quickly responds to an output power reduction instruction in the designation value saturation level excess state. When the difference between the first measured value and the second measured value is not within the allowable range, the mobile terminal to be tested is determined to be a non-quick-response type which does not quickly respond to the output power reduction instruction in the designation value saturation level excess state.

According to a second aspect of the invention, in the mobile terminal test device according to the first aspect, a period for which the setting means does not respond to the transmission signal from the mobile terminal may be shorter than a period which is predetermined to the mobile terminal and for which a transmission process is continuously performed even though there is no response.

According to a third aspect of the invention, in the mobile terminal test device according to the first aspect, the allowable range may have, as a center, a theoretical value Pd that is calculated from the values M and N by the following expression:

$$Pd = 10 \log(M/N).$$

According to a fourth aspect of the invention, there is provided a mobile terminal test method that performs communication between a simulated base station and a mobile terminal to be tested and tests the mobile terminal. The mobile terminal test method includes a step (S1 to S5) of not responding to a transmission signal from the mobile terminal until a predetermined period of time elapses after output power of the mobile terminal reaches a saturation level and of setting the mobile terminal to a designation value saturation level excess state in which an output power designation value for designating the output power in the mobile terminal is predicted to be within a range that is greater than the saturation level, during a random access process to the mobile terminal, a step (S6 to S9) of allocating M (where M is an integer equal to or greater than 2) resource blocks to an uplink physical channel, instructing the mobile terminal, which is set to the designation value saturation level excess state, to transmit a signal in which data is inserted into the allocated M resource blocks, and measuring power of a physical channel of the signal, and of allocating N (where N is an integer less than M) resource blocks to the uplink physical channel, instructing the mobile terminal, which is set to the designation value saturation level excess state, to transmit a signal in which data is inserted into the allocated N resource blocks, and measuring power of a physical channel of the signal, and a step (S10) of determining whether a difference between a first measured value which is measured when the mobile terminal transmits the signal in which the data is inserted into the M resource blocks and a second measured value which is measured when the mobile terminal transmits the signal in which the data is inserted into the N resource blocks is within a predetermined allowable range that is determined on the basis of a ratio of the value M to the value N. When the difference between the first measured value and the second measured value is within the allowable range, the mobile terminal is determined to be a quick response type which quickly responds to an output power reduction instruction in the designation value saturation level excess state. When the difference between the first measured value and the second measured value is not within the allowable range, the mobile terminal is determined to be a non-quick-response type which does not quickly respond to the output power reduction instruction in the designation value saturation level excess state.

Advantage of the Invention

As such, in the invention, the mobile terminal to be tested which is set to the designation value saturation level excess state is instructed to transmit the signal in which data is inserted into the M resource blocks. The reception power of the signal is measured as the first measured value. The mobile terminal is instructed to transmit the signal in which data is inserted into the N resource blocks (where N is less than M). The reception power of the signal is measured as the second measured value. It is determined whether the difference between the first and second measured values is within the allowable range that is determined by the ratio of M to N. It is determined whether the mobile terminal is a quick response type which quickly responds to the output power reduction instruction or a non-quick-response type which does not quickly respond to the output power reduction instruction, on the basis of the determination result.

This determination is performed using the following. The output power to uplink of the mobile terminal depends on the sum of the logarithm of the number of resource blocks and the output power designation value. When a large number of resource blocks are allocated to a terminal in which the output power designation value is increased and updated even after saturation, the output power (first measured value) falls within the saturation range (that is, the output power designation value is greater than the saturation level) and the difference between the output power when a large number of resource blocks are allocated and the output power (second measured value) when a small number of resource blocks are allocated is less than a power difference that is determined by a number ratio M/N. In contrast, even when a large number of resource blocks are allocated to a terminal in which the output power designation value is not increased and updated after saturation, the output power (first measured value) does not fall in the saturation range (that is, the output power designation value is not greater than the saturation level) and the difference between the output power when a large number of resource blocks are allocated and the output power (second measured value) when a small number of resource blocks are allocated is equal to the power difference that is determined by the number ratio M/N.

Therefore, it is possible to reliably and rapidly specify whether the mobile terminal is the quick response type that quickly responds to the output power reduction instruction from, for example, the base station or the non-quick-response type that does not quickly respond to the output power reduction instruction, using only the process of allocating two different numbers of resource blocks.

BEST MODE FOR CARRYING OUT THE INVENTION

Hereinafter, an embodiment of the invention will be described with reference to the drawings.

Figure 1:
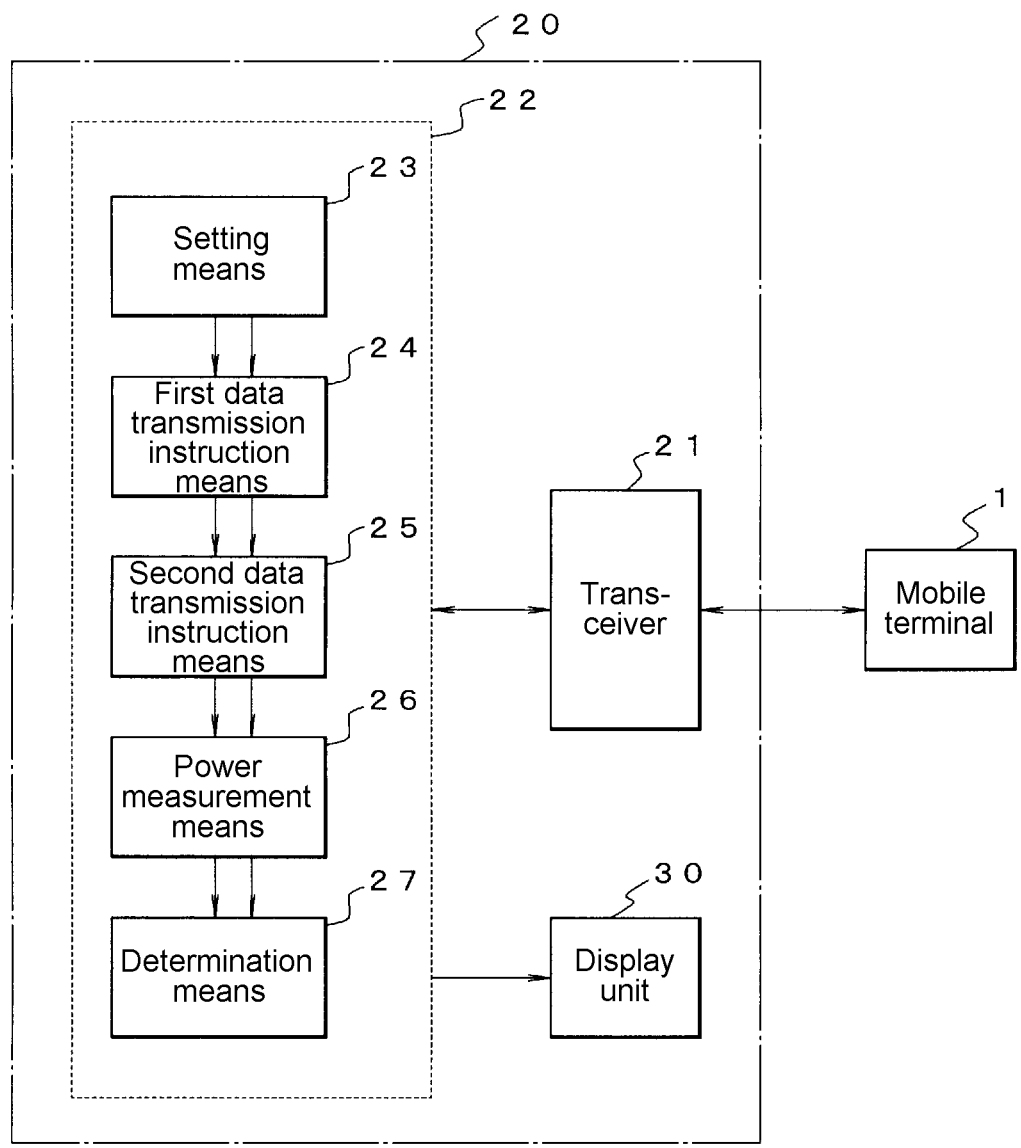
FIG. 1 is a diagram illustrating the structure of an embodiment of the invention.

FIG. 1 shows an example of the structure of a mobile terminal test device 20 (hereinafter, simply referred to as a test device 20) to which the invention is applied.

The test device 20 is a so-called pseudo base station device that simulates a base station, communicates with a mobile terminal 1 to be tested using a long term evolution (LTE) system, and tests the mobile terminal 1. The test device 20 includes a transceiver 21 and a test processing unit 22.

The transceiver 21 transmits a radio frequency signal which has been modulated from a data signal from the test processing unit 22 to the mobile terminal 1, demodulates a radio frequency signal from the mobile terminal 1 into a data signal, and transmits the data signal to the test processing unit 22.

The test processing unit 22 transmits or receives data required for a test to or from the mobile terminal 1 through the transceiver 21 and performs various tests for the mobile terminal 1.

Figure 2:
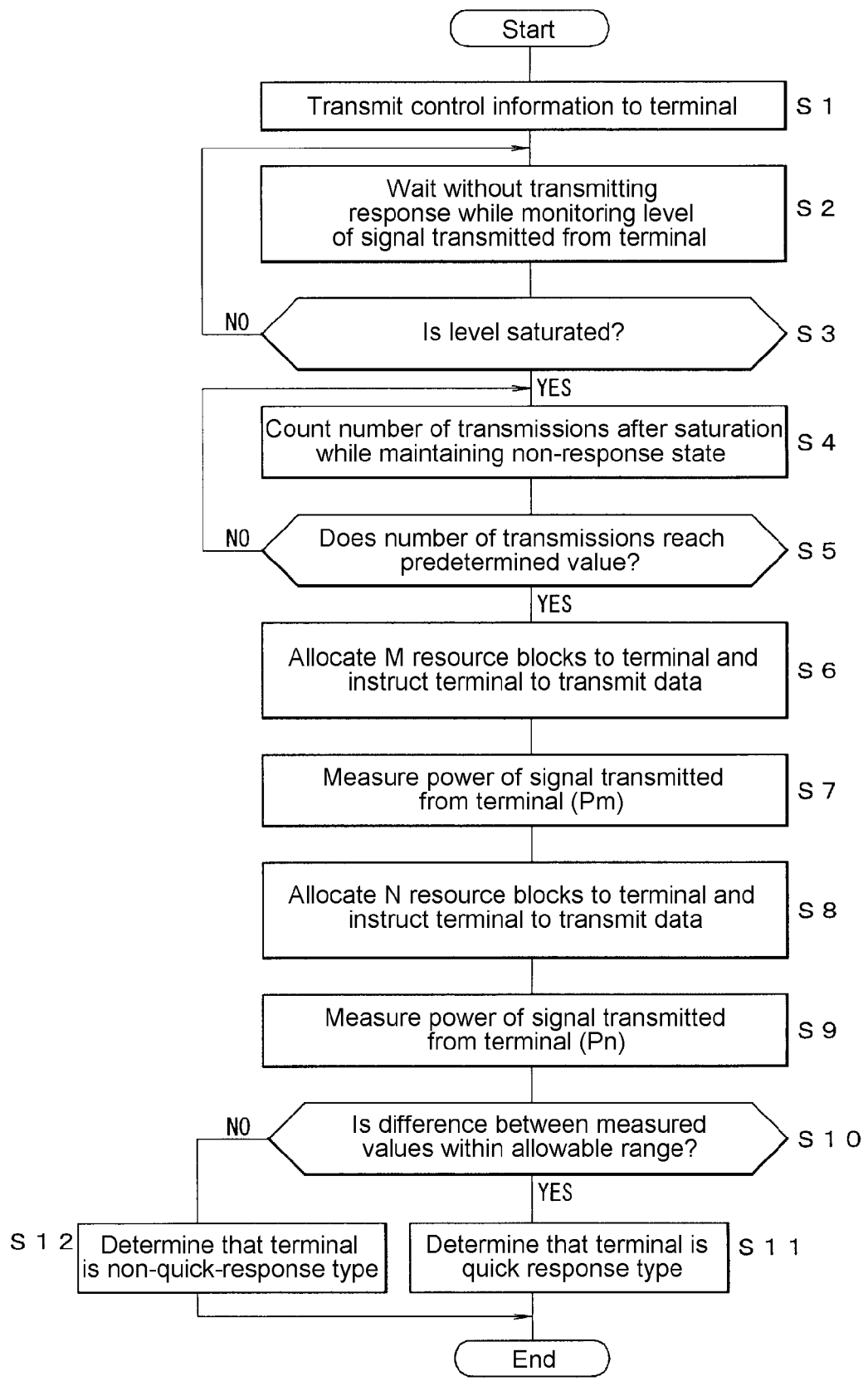
FIG. 2 is a flowchart illustrating the procedure of a process according to the embodiment of the invention.

The test processing unit 22 performs various tests. Therefore, here, components for determining whether the mobile terminal 1 quickly responds to an output power reduction instruction from the base station are described. FIG. 2 shows the procedure of a process performed by the components.

In a mobile communication system, during a random access process when the mobile terminal is connected to the base station, the mobile terminal transmits the type of random access preamble which is instructed by the base station with a relatively low output power through a specific channel, specifies, for example, uplink (UL) or downlink (DL) timing on the basis of response information which is transmitted from the base station in response to the type of random access preamble, and changes to a communication state.

The test processing unit 22 performs the same communication as described above. As shown in FIG. 2, setting means 23 transmits control information, such as the type of random access preamble, to the mobile terminal (S1) and monitors the signal level of the preamble channel (hereinafter, referred to as PRACH) of a transmission signal which is transmitted from the mobile terminal 1 to the test device 20 in response to the control information (S2). In the case of the general communication between the base station and the mobile terminal, when the PRACH has a sufficient signal level, the base station immediately responds to the mobile terminal and changes to a state in which it performs data communication with the mobile terminal. The setting means 23 is in a standby state, without responding to the mobile terminal 1.

As such, when there is no response from the test device 20, the mobile terminal 1 determines that output power is not sufficient and repeatedly performs a process of spontaneously increasing an output power designation value for designating output power by a predetermined value $\Delta P$ (for example, $\Delta P = 2$ dB) and outputting a signal to the test device 20 again until a response is received from the test device 20 (the spontaneous output power control of the mobile terminal 1 is referred to as open loop power control).

Figure 3:
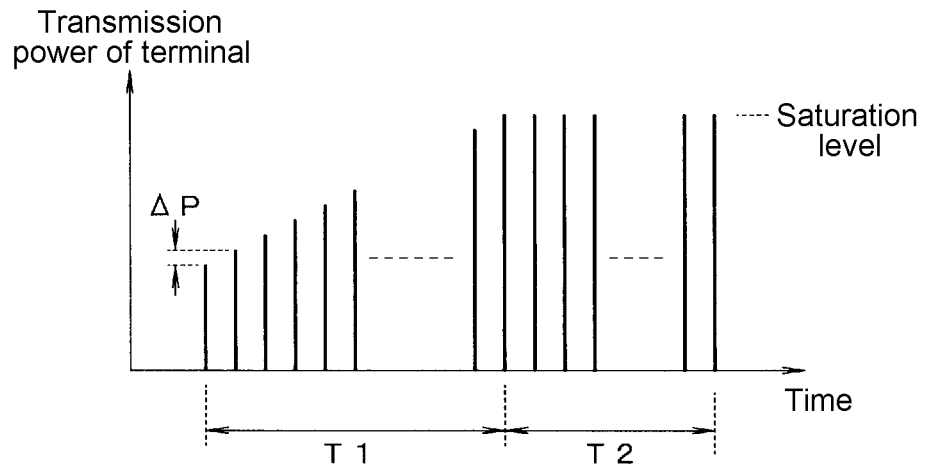
FIG. 3 is a diagram illustrating a change in the power of an output signal from a mobile terminal until the mobile terminal reaches a designation value saturation level excess state.

Therefore, the output power of the signal which is transmitted by the mobile terminal 1 through a specific channel (PRACH) is increased by a predetermined value $\Delta P$ at a predetermined time interval as shown in FIG. 3. Even after the output power reaches a saturation level, the mobile terminal continuously performs the process.

The setting means 23 does not transmit a response to the mobile terminal 1 for a period T1 for which the level of the transmission signal from the mobile terminal 1 increases and a period T2 until the transmission signal is received from the mobile terminal 1 a predetermined number of times at the saturation level (S2 to S5). The mobile terminal 1 performs the transmission process a predetermined number of times K. When a response is received from the test device 20 during the transmission process, the mobile terminal 1 stops a connection process to the test device 20. Therefore, the number of transmission processes for all of the periods T1 and T2 is set to a value less than K.

As such, even after the output power of the mobile terminal 1 reaches the saturation level, no response is transmitted for a period corresponding to a predetermined number of transmission processes. Therefore, it is possible to set the mobile terminal 1 to be tested to a designation value saturation level excess state in which the output power designation value accumulated in the mobile terminal 1 is predicted to be in a predetermined range that is significantly greater than the saturation level. In this stage, it is unclear whether the mobile terminal 1 actually has the output power designation value in the range that is greater than the saturation level.

First data transmission instruction means 24 allocates, to the mobile terminal 1 which is set to the designation value saturation level excess state by the setting means 23, M (M is equal to or greater than 2; for example, 100 or 50) resource blocks among the resource blocks which can be allocated through an uplink physical channel (PUSCH), while maintaining the current output power designation value, and instructs the mobile terminal 1 to transmit a signal in which data is inserted into the allocated M resource blocks (S6).

Here, the resource block includes 12 sub-carriers which are adjacent at an interval of 15 kHz in a frequency axis direction in the LTE mobile communication system using orthogonal frequency division multiplexing (OFDM). A block obtained by dividing the resource block every 1 ms in the time axis direction is a unit and can be flexibly allocated to the user, if necessary.

Figure 4:
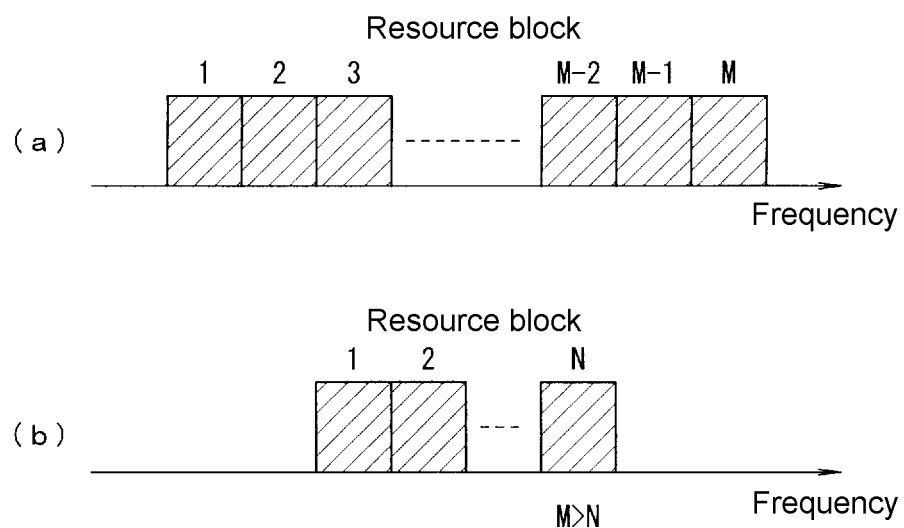
FIG. 4 is a diagram illustrating a case in which the mobile terminal transmits data using different numbers of resource blocks.

When receiving the instruction, the mobile terminal 1 outputs the signal in which data is inserted into the M resource blocks, as shown in FIG. 4(a).

Second data transmission instruction means 25 allocates, to the mobile terminal 1 which is set to the designation value saturation level excess state, N (N is less than M; for example, 1, 2, or 3) resource blocks among the resource blocks which can be allocated through the uplink physical channel (PUSCH), while maintaining the current output power designation value, and instructs the mobile terminal 1 to transmit a signal in which data is inserted into the allocated N resource blocks (S8).

When receiving the instruction, the mobile terminal 1 outputs the signal in which data is inserted into the N resource blocks, as shown in FIG. 4(b).

Power measurement means 26 measures the band power of the physical channel of the signal which is transmitted by the mobile terminal 1 in response to the instructions from the first data transmission instruction means 24 and the second data transmission instruction means 25 (S7 and S9) and outputs the measured band power as a first measured value Pm and a second measured value Pn to the determination means 27.

The procedure of the process is not limited to the example shown in FIG. 2. The instruction to transmit data using the N resource blocks and the measurement of the level may be performed before the instruction to transmit data using the M resource blocks and the measurement of the level.

Determination means 27 determines whether a difference between the measured values Pm and Pn is within an allowable range determined by the ratio between the values M and N (S10).

Here, when the difference between the first measured value Pm and the second measured value Pn is within the allowable range, it is determined that the mobile terminal 1 to be tested is a quick response type which quickly responds to the output power reduction instruction in the designation value saturation level excess state (S11). When the difference between the first measured value Pm and the second measured value Pn is not within the allowable range, it is determined that the mobile terminal 1 to be tested is a non-quick-response type which does not quickly respond to the output power reduction instruction in the designation value saturation level excess state (S12).

The test processing unit 22 displays, for example, the above-mentioned test result or the test results for other test items on a display unit 30.

As described above, the determination means 27 performs the determination, using the following. The output power to uplink of the mobile terminal 1 depends on the sum of the logarithm of the number of resource blocks and the output power designation value. When a large number of resource blocks are allocated to a terminal in which the output power designation value is accumulated and increased even after saturation, the output power (first measured value Pm) falls within the saturation range (that is, the output power designation value is greater than the saturation level) and the difference between the output power when a large number of resource blocks are allocated and the output power (second measured value Pn) when a small number of resource blocks are allocated is less than a power difference that is determined by the number ratio M/N. In contrast, even when a large number of resource blocks are allocated to a terminal in which the output power designation value is not accumulated after saturation, the output power (first measured value Pm) does not fall in the saturation range (that is, the output power designation value is not greater than the saturation level) and the difference between the output power when a large number of resource blocks are allocated and the output power (second measured value Pn) when a small number of resource blocks are allocated is equal to the power difference that is determined by the number ratio M/N.

Therefore, it is possible to reliably specify whether the mobile terminal 1 is the quick response type that quickly responds to the output power reduction instruction from, for example, the base station or the non-quick-response type that does not quickly respond to the output power reduction instruction, using only the process of allocating two different numbers of resource blocks and instructing the mobile terminal to transmit a signal.

Next, a detailed numerical example will be described.

As represented by the following Expression (1), the data transmission output power of the mobile terminal 1 during uplink is represented by the lower of power Pr that is determined by the sum of a value that is ten times the logarithm of the number of allocated resource blocks R (power equivalent), an internal output power designation value f, and a constant c, such as loss, and the maximum output power Pmax of the mobile terminal 1.

$$Pr = 10 \log R + f + c \text{ (dBm)} \quad \text{[Expression (1)]}$$

Figure 5:
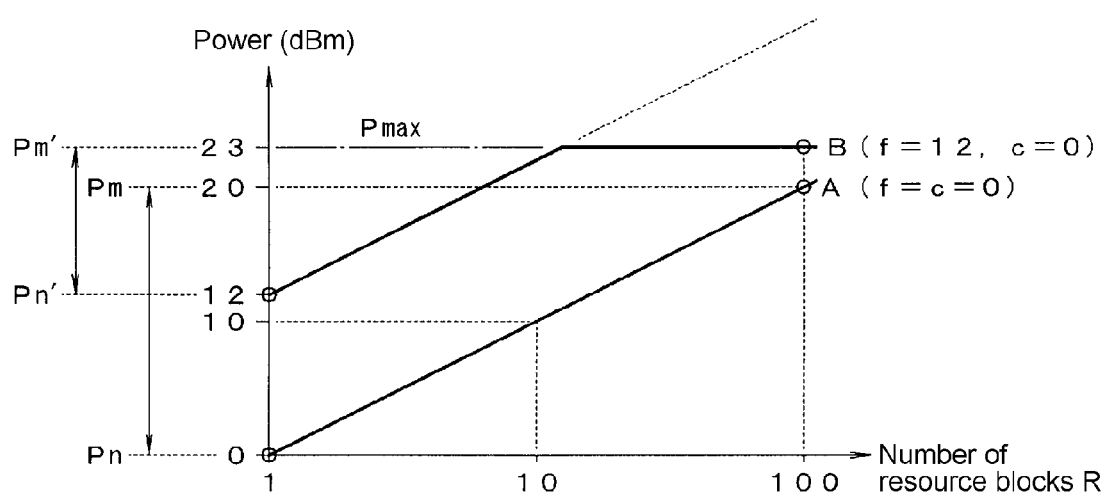
FIG. 5 is a diagram illustrating a detailed numerical example related to a determination process according to the embodiment.

For simplicity of description, the constant c is set to 0. Here, as shown in FIG. 5, a terminal with a small output power designation value f (for example, f=0 dBm) has the characteristics of a straight line A in which, when the number of resource blocks R is 1, 10, and 100, the output power is 0, 10, and 20 (dBm), respectively. When R=M=100 and R=N=1 are established, the difference between the measured values is Pm−Pn=20 (dB). Here, the maximum output power Pmax is 23 (dBm).

On the other hand, a power difference Pd which is theoretically obtained from the ratio M/N between the numbers of resource blocks is 10 log(M/N)=20 (dB). Therefore, for example, when the width of the allowable range is ±3 dB and the difference between the measured values falls in the allowable range 20±3 (dB) of the theoretical value Pd=20 (dB), the output power designation value is not accumulated after saturation in the setting stage of the setting means 23 in the mobile terminal 1 and the mobile terminal 1 can be determined to be the quick response type which quickly responds to the output power reduction instruction from, for example, the base station.

In contrast, the mobile terminal 1 in which the output power designation value is accumulated after saturation in the setting stage of the setting means 23 and the output power designation value f increases (for example, f=12 dBm) has the characteristics that the straight line A is shifted upward by the output power designation value f and becomes a broken line B in which the output power intersects the maximum output power Pmax before the number of resource blocks R reaches 100 and is limited to a maximum output power of 23 (dBm) in the range in which the number of resource blocks is greater than that at the intersection.

Therefore, from the characteristics of the broken line B, the first measured value Pm' is 23 (dBm) when R and M are 100 and the second measured value Pn' is 12 (dBm) that is equal to f when R and N are 1. The difference between the measured values is Pm'-Pn'=11 (dB).

In contrast, the power difference which is theoretically obtained from the ratio M/N between the numbers of resource blocks is 20 (dB) as described above and the difference, 11 (dB), between the measured values falls within the allowable range 20±3 (dB) of the power difference. Therefore, the output power designation value is accumulated after saturation in the mobile terminal 1 to be tested and the mobile terminal 1 can be determined to be the non-quick-response type that does not quickly respond to the output power reduction instruction from, for example, the base station.

As such, according to the test device 20 having the above-mentioned structure, it is possible to rapidly and reliably specify whether the mobile terminal 1 to be tested is the quick response type which quickly responds to the output power reduction instruction from, for example, the base station or the non-quick-response type which does not quickly respond to the output power reduction instruction, using only the process of allocating two different number of resource blocks and instructing transmission.

In the above-mentioned example, M is 100 and N is 1. However, it is advantageous to increase the ratio M/N of M to N (the ratio is the maximum when M is the maximum value of the number of allocable resource blocks and N is 1 that is the minimum value) in order to reliably perform the determination. The ratio may be an arbitrary value when it is sufficiently large with respect to the width of the allowable range used for determination. When the width of the allowable range is ±3 dB as described above, the ratio of M to N may be reduced to about 10.

DESCRIPTION OF REFERENCE NUMERALS AND SIGNS

1: MOBILE TERMINAL
20: MOBILE TERMINAL TEST DEVICE
21: TRANSCEIVER
22: TEST PROCESSING UNIT
23: SETTING MEANS
24: FIRST DATA TRANSMISSION INSTRUCTION MEANS
25: SECOND DATA TRANSMISSION INSTRUCTION MEANS
26: POWER MEASUREMENT MEANS
27: DETERMINATION MEANS
30: DISPLAY UNIT

What is claimed is:

1. A mobile terminal test method that performs communication between a simulated base station and a mobile terminal to be tested and tests the mobile terminal, comprising:

a step of not responding to a transmission signal from the mobile terminal until a predetermined period of time elapses after output power of the mobile terminal reaches a saturation level and of setting the mobile terminal to a designation value saturation level excess state in which an output power designation value for designating the output power in the mobile terminal is predicted to be within a range that is greater than the saturation level, during a random access process to the mobile terminal;

a step of allocating M (where M is an integer equal to or greater than 2) resource blocks to an uplink physical channel, instructing the mobile terminal, which is set to the designation value saturation level excess state, to transmit a signal in which data is inserted into the allocated M resource blocks, and measuring power of a physical channel of the signal, and of allocating N (where N is an integer less than M) resource blocks to the uplink physical channel, instructing the mobile terminal, which is set to the designation value saturation level excess state, to transmit a signal in which data is inserted into the allocated N resource blocks, and measuring power of a physical channel of the signal; and a step of determining whether a difference between a first measured value which is measured when the mobile terminal transmits the signal in which the data is inserted into the M resource blocks and a second measured value which is measured when the mobile terminal transmits the signal in which the data is inserted into the N resource blocks is within a predetermined allowable range that is determined on the basis of a ratio of the value M to the value N, wherein, when the difference between the first measured value and the second measured value is within the allowable range, the mobile terminal is determined to be a quick response type which quickly responds to an output power reduction instruction in the designation value saturation level excess state, and when the difference between the first measured value and the second measured value is not within the allowable range, the mobile terminal is determined to be a non-quick-response type which does not quickly respond to the output power reduction instruction in the designation value saturation level excess state.

2. The mobile terminal test method according to claim 1, wherein a period for which the setting step does not respond to the transmission signal from the mobile terminal is shorter than a period which is predetermined to the mobile terminal and for which a transmission process is continuously performed even though there is no response.

3. The mobile terminal test method according to claim 1, wherein the allowable range has, as a center, a theoretical value Pd that is calculated from the values M and N by the following expression:

$$Pd = 10 \log(M/N).$$

* * * * *